United States Patent Office 3,562,788
Patented Feb. 9, 1971

3,562,788
THERMAL DEGRADATION OF POLYOLEFINS
Doyle A. Weemes and Richard L. McConnell, Kingsport, Tenn., assignors to Eastman Kodak Company, Rochester N.Y., a corporation of New York
No Drawing. Filed June 8, 1967, Ser. No. 644,493
Int. Cl. C08f 15/04
U.S. Cl. 260—88.2         20 Claims

ABSTRACT OF THE DISCLOSURE

A process for the preparation of low viscosity polyolefin waxes by the thermal degradation of high molecular weight olefin polymers in the presence of metal coordination polymerization catalyst residue. The high molecular weight polymer is thermally degraded in the presence of an inactive catalyst residue to produce a low viscosity wax. The thermal degradation is generally carried out at temperatures of about 150 to 400° C. and in the absence of oxygen.

---

This invention relates to the preparation of low viscosity polyolefin waxes. More particularly, it relates to the preparation of such low viscosity waxes by the catalytic thermal degradation of high molecular weight polyolefins.

Considerable effort has been devoted in the past to the development of low viscosity synthetic waxes that can be substituted for naturally occurring waxes, such as cernauba wax and the like. This work has developed a number of suitable synthetic waxes, particularly low molecular weight, low voscisity polyolefin waxes, such as, polyethylene and polypropylene waxes.

One conventional method for producing such polyolefin waxes is by the thermal degradation of high molecular weight solid olefinic polymers. Thus, for example, polypropylene is typically polymerized by catalysis with a metal-containing cordination catalyst to a high molecular weight, crystalline solid polymer and then converted to the desired wax by thermal degradation. A process for the production of polypropylene waxes by this procedure is shown, for example, in U.S. Pat. 2,835,659.

The threshold temperature for thermal cracking of polypropylene and other poly-alpha-olefins is about 290° C. In one type of prior art process, for example, the thermal degradation of polyolefins to low molecular weight, low viscosity waxes, it has been necessary to use temperatures above this thermal cracking level to achieve the desired degradation of the polymer. Because the rate of degradation increases as the temperature is raised above 290° C., temperatures substantially in excess of this level have generally been used in prior art commercial processes. For example, U.S. Pat. 2,835,659 teaches the thermal degradation of polypropylene at a temperature of about 300 to 450° C.

Economic considerations also have generally required the use of high temperatures in prior art thermal degradation processes. To produce waxes of desirable molecular weight and viscosity characteristics in economically feasible reaction times, it has generally been necessary to operate at very high temperature levels. For example, high temperatures are necessary to produce synthetic waxes by thermal degradation of high molecular weight polyethylene than are generally required to degrade polypropylene.

Although prior art thermal degradation processes have achieved a great measure of success, and have produced highly desirable synthetic waxes, the requirement that very high temperatures be used in the degradation step of these processes has produced a myriad of problems. For example, such high temperatures often produce charring of the polymer being degraded. Overdegradation of the polyolefins to very low molecular weight oils and volatile hydrocarbons is also frequently experienced. In the thermal degradation of polyethylene, for example, problems of polymer cross-linking may be encountered at the highly elevated temperatures used in the degradation step. Such cross-linking is especially troublesome when traces of air are present.

Various attempts have been made to avoid the problems resulting from the use of these high-temperature thermal degradation processes for making synthetic waxes. For example, it has been proposed to use lower temperatures and longer contact or reaction times in the thermal cracking or degradation of the high molecular weight polymers. The use of long contact times, however, not only decreases the economic efficiency of the processes by reducing the production rate of the wax products, but also can cause undesirable discoloration of the final wax products. The prior art, therefore, has not provided a process that allows a reduction of the temperature at which the degradation is carried out without adversely affecting the reaction time necessary for completion of the degradation process.

Other prior art processes that have been proposed to overcome the foregoing problems have involved the addition of modifying polymers to the high molecular weight polyolefins to be degraded to modify the properties of the final wax products. The use of these modifying polymers, however, introduced incident problems resulting from the formation of graft or block copolymers between the polyolefins and the modifying polymers.

An additional difficulty encountered in the prior art production of low molecular weight, low viscosity synthetic waxes by thermal degradation of high molecular weight solid olefin polymers results from the difficulty of removing the olefin polymerization catalyst from the high polymer prior to its thermal degradation. The removal of catalyst residues from polyolefins is important because of the adverse effect the presence of such catalyst residues has on both the polymer itself and equipment used to handle it.

Polyolefins containing catalyst residues discolor rapidly on heating during processing, and are corrosive to molds and dies used during polymer extrusion or other shaping and molding operations. The discoloration and corrosion problems are particularly pronounced when the polymer is stored or processed in the presence of air, and oxidative deterioration of the polymer may even occur during storage when catalyst residues are not promptly removed from the polymers. This oxidation of the polymer contributes to embrittlement and the development of a rancid odor in the polymer products.

Because of these deleterious effects of catalyst residues on polyolefins, it has previously been considered essential that the catalyst residue be removed prior to thermal degradation of high molecular weight polyolefins to low molecular weight synthetic waxes.

Catalyst residues are generally removed from the solid polymers after polymerization and before thermal degradation by washing or filtration, or by a combination of both of these operations. The washing procedure is usally carried out with an alcohol in which metallic components of the catalyst are soluble. After these metals are dissolved in the alcohol or other suitable solvent, the metals are leached or otherwise separated from the polymer. Acids or organic complexing agents, such as acetylacetone, may be added to the alcohol washing agent to facilitate the removal of the catalyst residues.

Complete removal of catalyst residues from high molecular weight polyolefins by washing with alcohols or the like is difficult since the catalyst residues become embedded or entrapped within the polymers, making it difficult for the alcohol to contact the catalyst. This is particularly true when the polymer is a soluble polymer, such as certain alpha-olefin copolymers, which tends to coat the catalyst and prevent contact of the catalyst with the alcohol. For this reason, it is usually necessary to use filtration procedures to remove catalyst residues from these copolymers.

The filtration techniques include dissolving the polyolefin in a suitable solvent, such as, for example, benzene, toluene, xylene, Tetralin, octane, mineral spirits, mineral oil or other hydrocarbon solvents, at elevated temperatures, and then filtering the solution through asbestos, diatomaceous earth, alumina, silica, or other suitable filtering media to remove the insoluble catalyst residues. The solvent is then removed from the polyolefins by conventional distillation or stripping procedures to isolate the polymer.

The use of such filtration procedures for catalyst removal presents economic problems. The high molecular weight polymers from which the catalyst is to be removed have only very limited solubility in the solvent materials. Further, because of the high molecular weights of the polymers, the viscosity of the polymer solutions are quite high even when the solutions contain only a small percentage by weight of polymer. For these reasons, the dissolving, stripping and solvent recovery procedures used in these processes involve the use and recovery of large quantities of solvent and are an added expense in polymer manufacture that is carried over into the cost of synthetic waxes produced from these high polymers.

Accordingly, and in view of the foregoing disadvantages of prior art procedures, it is an object of the present invention to provide a new and improved process for the production of low viscosity polyolefin waxes using relatively lower temperatures, or shorter degradation reaction times, or both.

Another object of this invention is to provide an improved process for the production of low viscosity synthetic polyolefin waxes by the thermal degradation of high molecular weight olefin polymers at temperatures sufficiently low to avoid or reduce charring, cross-linking, or other undesirable side reactions during degradation of the polymers.

Still another object of the present invention is to provide an improved process for the production of synthetic polyolefin waxes from high molecular weight olefin polymers by thermal degradation of such high polymers at temperature levels sufficiently low that the degradation rate of the polymer can be controlled to prevent overdegradation of the polymer to low molecular weight oils or volatile hydrocarbons.

Yet another object of this invention is to provide a process for the production of synthetic polyolefin waxes from high molecular weight polyolefins at reduced contact times, and at temperature levels that do not adversely affect the polymer products at such contact times, to prevent discoloration of the wax products and to provide increased production rates not normally attainable at such temperature levels.

A further object of this invention is to provide a catalytic process for the thermal degradation of high molecular weight polyolefins that can be carried out at relatively low temperatures and short contact times and which affords an economical procedure for the production of such waxes. The economies of the process are further increased because the process affords a simple and direct procedure for removal of the catalyst used in the production of the olefin polymers.

Further and additional objects and advantages of the invention will be apparent to those skilled in the art from the detailed disclosure that follows.

The above and other objects of this invention are accomplished by a process for the preparation of low viscosity synthetic polyolefin waxes which comprises polymerizing an olefin to a high molecular weight polymer in the presence of a metal-containing coordination catalyst, and heating the high molecular weight polyolefin at a temperature of from about 150 to 400° C. in the absence of oxygen and in the presence of the residue of the catalyst for a time sufficient to thermally degrade the high molecular weight polyolefin to a low viscosity wax. The process of this invention can also be carried out using a pre-existing olefin polymer from which the polymerization catalyst residue has already been removed by adding a metal-containing polymerization catalyst, or catalyst residue, to the high molecular weight polymer. The polymer is then heated at from 150 to 400° C. in the absence of oxygen for a time sufficient to produce a low viscosity polyolefin wax. The catalyst residue present in the final polyolefin wax product can be readily removed by conventional washing and filtration techniques without the incident problems incurred when the residues are removed from the olefin polymers prior to the thermal degradation. The process of this invention, therefore, allows the preparation of low viscosity synthetic waxes from high molecular weight polyolefins by thermal degradation of the polyolefins at faster rates and/or at lower temperatures by carrying out the thermal degradation step in the presence of the catalyst residues. The improvements derived from the present process not only increase the economy of the process, but also produce a wax product that has not been adversely affected by the harsh prior art preparation procedures.

In accordance with the invention, the high molecular weight polymers used to produce the low viscosity polyolefin waxes can be prepared from any desired olefin starting materials by conventional polymerization processes for preparing polymeric materials and include homopolymers, copolymers, terpolymers and the like.

Such homopolymers include polyethylene, polypropylene, poly-1-butene, poly-1-pentene, poly-1-hexene, poly-1-dodecene, poly - 4 - methyl - 1-pentene, poly-3-methyl-1-butene, and the like; as well as copolymers of ethylene and propylene, ethylene and 1-butene, propylene and 1-butene, propylene and 4-methyl-1-pentene, 1-butene and 4-methyl-1-pentene, propylene and 1-hexene, propylene and 1-dodecene, 4-methyl-1-pentene and 1-hexene, 1-butene and 1-pentene, 1-butene and 1-octene, 1-butene and 4,4-dimethyl-1-pentene, and the like. Particularly important synthetic wax products are produced using high molecular weight polymers of ethylene, propylene, and 1-butene, or copolymers or terpolymers of these alpha olefins.

The extent to which these alpha olefins are polymerized prior to thermal degradation is not critical, and the polyolefin may be of any desired molecular weight. One method of estimating the molecular weight of a polyolefin involves the measurement of its inherent viscosity in tetralin. Polymers suitable for use in the process of this invention may have an inherent viscosity of about 0.7 up to about 10.0 or the molecular weight of the polymer may be so high that it is insoluble in tetralin. While the density of the high molecular weight polyolefins degraded in accordance with the present process is not critical, the density of these polymers is, in general, in the range of about 0.83 to about 0.98 as measured in a solvent gradient tube.

As pointed out hereinbefore, the preparation of the high molecular weight polyolefins can be carried out by conventional polymerization processes using conventional equipment, both of which are well known to those skilled in the art. For example, one such suitable process is the process for preparing highly crystalline polypropylene according to U.S. Pat. No. 2,969,345. The polymerization is carried out in the presence of a metal-containing coordination catalyst. Such olefin polymerization catalysts are also well known and generally comprise a transition metal halide in combination with a metal alkyl or metal hydride. Examples of such transition metal halides are titanium (Ti) or vanadium (V) compounds such as $TiX_3$, $TiX_4$, $VX_3$, $VX_4$, $VOX_3$, and the like, where X is a halogen selected from the group consisting of chlorine (Cl), bromine (Br), and iodine (I).

Examples of such metal alkyl or metal hydride components are the alkyl or hydride of one or more metals of Groups I, II, and III of the Periodic Table. Metal alkyls of aluminum (Al) and magnesium (Mg) are preferred, but alkyls and hydrides of such other metals as lithium (Li), beryllium (Be), sodium (Na), and the like may also be used.

Exemplary of such metal alkyls and metal hydrides are compounds having the formula $R_3Al$, $R_2AlX$, $RMgX$, $R_2Mg$, $LiAlH_4$, $NaAlH_4$, $LiAlR_4$, $R_2Be$, $RNa$, $RLi$, and the like, where X is a halogen such as chlorine, bromine or iodine and R is an alkyl, cycloalkyl, or aryl group. More specifically, R may represent such radicals as ethyl, isopropyl, butyl, octyl, cyclohexyl, phenyl, benzyl, or the like.

The metal alkyl component of the coordination catalyst can also contain adducts of the above or like compounds with amines, amides, or phosphine radicals, such as carboxyl amides, tertiary amines, phosphorus amides, tertiary phosphines, and the like. Exemplary of these more complex metal alkyl components are compounds represented by the formulas $RAlX_2 \cdot Z$ and $R_3Al_2X_3 \cdot Z$, where R and X are as defined above, and Z represents a phosphorus amide such as hexamethylphosphoric triamide, carboxyl amide such as dimethylformamide, tertiary amine such as tributylamine, tertiary phosphine such as triphenylphosphine or the like.

The amount of catalyst used in the olefin polymerization is not critical, and is well within the skill of the worker skilled in the art. For example, the amounts of catalyst between about 0.1% and 2.0% by weight of the olefin being polymerized may be included in the polymerization medium.

In accordance with the invention, the high molecular weight polyolefin is thermally degraded by heating in the presence of the catalyst residue remaining in the polymer after separation from the reactor. The presence of the catalyst residue in the polymer during the thermal degradation step has been found to allow the use of lower degradation temperatures and/or shorter degradation times.

The catalyst residue present in the thermal degradation medium can be "live," i.e., still be capable of promoting olefin polymerization; or the catalyst can be inactivated by treatment with air, moisture, alcohols or other chemical deactivating agents before degradation is initiated.

The catalytic degradation of the present process is carried out in the melt phase of the polymer at temperatures of from about 150 to 400° C. The threshold cracking temperature of polyolefins is about 290° C., however, and it is preferred in accordance with the present process to degrade the polymer at temperatures at or below this temperature because such low temperature operation avoids polymer charring, cross-linking, overdegradation, and the like, achieved when the thermal degradation step is carried out at a temperature not greater than about 290° C. The preferred operating temperature of the degradation step is about 250 to 275° C.

In certain instances, it may be desirable to carry out the degradation at temperatures above the threshold cracking temperature of the polyolefin. For example, with certain polyolefins, or polyolefins of certain molecular weight levels, it may be desirable to use higher temperatures to reduce the contact or reaction times necessary to degrade the polymer to the desired wax product. Such high temperature, short contact time procedures are particularly desirable, for example, for use with polymers which have a high tendency to discolor. For these reasons, the present process also contemplates the use of thermal degradation temperatures up to about 400° C.

Catalytic degradation of high molecular weight polyolefins by the present process can be carried out either batchwise or in a continuous manner. The reaction or contact period required for this degradation can be varied widely, and depends in large measure on the particular degradation temperature used, the polymer being degraded, and the initial molecular weight of the polymer. Reaction times on the order of about 5 minutes or less to about 1 hour or longer can be used, as will be illustrated by the specific examples set forth below.

The high molecular weight polyolefins can be thermally degraded in any suitable equipment, which can be constructed of glass or a suitable metal, such as stainless steel. The thermal degradation can be carried out in stirred stainless steel or glass reaction vessels, in stirred multizone reactors, in extruders, in flowing-stream tubular reactors, or in other suitable equipment. If tubular reactors are used, it is often convenient to use a corebuster inside the tube to provide thin layers of polymer.

In accordance with the invention, the thermal degradation of high molecular weight polyolefins to low viscosity waxes is carried out in the substantial absence of oxygen. Thus, air must be substantially excluded from the polymer being degraded. This exclusion can be accomplished in any suitable manner, such as by providing an atmosphere of an inert gas such as nitrogen in the degradation vessel, by carrying out the thermal degradation under vacuum or by carrying out the degradation in an inert hydrocarbon diluent. Any of these procedures can be used in either batch or continuous operations.

When thermal degradation of the high molecular weight polyolefin is complete, and the desired synthetic wax has been produced, it is desirable to remove the coordination catalyst residue from the low viscosity wax product. The removal of catalyst residues is readily accomplished. This ease of catalyst removal is another important benefit of the present invention and can be strikingly contrasted with the difficulty which has been encountered in the past in removing the catalyst residues from the high molecular weight polyolefins before thermal degradation.

Live or activated catalyst residues are readily removed from the synthetic wax products of the present process by conventional treatment with alcohols, such as ethyl alcohol, isopropyl alcohol, butyl alcohol, isobutyl alcohol or the like. These alcohols deactivate the live catalyst residue and dissolve all of the catalyst residue embedded in the low molecular weight waxes. Also the live or inactivated catalyst residues can be readily removed from the synthetic wax products by conventional filtration techniques. The wax products can be dissolved in a suitable hydrocarbon or halogenated hydrocarbon solvent or the like, and filtered through conventional filtering media such as asbestos, diatomaceous earth, alumina, or the like, to remove the insoluble catalyst residue from the wax solution. The polyolefin wax product is then isolated from the solvent by conventional distillation or stripping techniques or like procedures. The low molecular weight polyolefin waxes are much more readily dissolved in such solvents than the high molecular weight polyolefins from which they are prepared. Further, the viscosities of these wax solutions are substantially lower than those of high molecular weight polyolefin solutions at any given solids concentration which provides for easier pumping and filtration procedures. For these reasons, the amount of solvent used in the catalyst residue removal procedures of the present process is much lower than those required in the prior art processes for removing the catalyst from the high polymer prior to thermal degradation. This use of lesser amounts of solvent, along with the ease of pumping, filtration, and the like, acts to reduce the overall cost of the process and hence to allow the production of more economical wax products.

As pointed out above, air can be excluded from the thermal degradation step of the present process by carrying out the process in a solution of the polymer to be degraded. If a diluent is selected in which the wax product of the degradation is soluble, the reaction solution can be filtered to remove the catalyst residue directly on the completion of the degradation of the polyolefin.

The polyolefin wax products produced by the process of this invention are low molecular weight, low viscosity waxes having substantially the same properties as the waxes obtained from conventional prior art thermal degradation processes. These products generally have inherent viscosities of about 0.05 to about 0.7 at 145° C. in Tetralin; melt viscosity of from about 100 to 100,000 centipoises as measured at 190° C. using ASTM Procedure D–1238–57T with orifice size of 0.04±0.0002 in. and a 325 gram weight, densities of about 0.83 to about 0.98 as measured in a solvent gradient tube; and acid numbers of not greater than about 3.0 and preferably of substantially zero.

The acid number is determind by weighing 2 grams of polyethylene wax into a 250 ml. Erlenmeyer flask (glass-stoppered). Add 100 ml. of distilled toluene. Heat to effect solution. Add 6–10 drops phenolphthalein indicator. Titrate the sample while hot to a permanent faint pink color with 0.05 N NaOH. The titration is continued until a faint pink color persists for 10–20 seconds. Care must be taken to keep the flask closed when trying to determine if the end-point has been reached, otherwise $CO_2$ will react with the excess alkali and cause a fading end-point.

Determine a blank using the above procedure without the addition of the wax sample.

CALCULATION $$\text{Acid No.} = \frac{(S-B) \times N \times 56.1}{W}$$

where:

S=sample titration in ml.
B=blank titration in ml.
N=normality of NaOH
W=weight of sample in grams The low melt viscosity characteristics of these waxes are particularly important, because they make it possible to apply these wax materials directly in the molten state as protective coatings to substrates. The wax products of this invention also are valuable as paraffin additives, as coatings for paper, paperboard and the like, for use as decorative coatings, as slip agents in printing inks, as lubricating aids in rubber compounding, and for melt index control of high molecular weight polyolefin plastics.

Oxidation of the polyethylene waxes produced in accordance with the present process provides emulsifiable products which are used in floor-polishes, textile treatment procedures, and as resin intermediates. Also, emulsifiable products are prepared by reacting the low viscosity polyethylene waxes produced by the present process with maleic anhydride to produce emulsifiable products having saponification numbers of 15 to 35 which can be used in the treatment of textiles to provide scuff resistance for permanent press fabrics, and in preparing floor polishes having high gloss, high hardness, and good slip resistance.

The invention can be further illustrated by the following examples of preferred embodiments thereof; although it will be understood that these examples are included merely for purposes of illustration and are not intended to limit the scope of the invention unless otherwise specifically indicated. Also, all parts and percentages are by weight unless otherwise specifically indicated.

EXAMPLE 1

One hundred (100) grams of high molecular weight polypropylene (I.V. 4.1) are prepared in a stainless steel autoclave by polymerization of propylene at 85° C. in the presence of 9.5 grams of a 1/0.6/1

$C_2H_5AlCl_2/[(CH_3)_2N]_3$

P(O)/$TiCl_3$ polymerization catalyst.

The autoclave is then cooled to room temperature and vented to remove any unreacted propylene. The high molecular weight polypropylene resulting from this polymerization is treated with ten (10) ml. of dry isobutyl alcohol to deactivate the catalyst residues which are left distributed throughout the polymer.

The autoclave is then heated to 250° C., with rocking, under a nitrogen atmosphere, and is maintained at that temperature for about one (1) hour. The autoclave is then cooled to room temperature, and the polymer is removed and washed with 400 ml. of hot isobutyl alcohol to remove the catalyst residues. The washing with hot isobutyl alcohol is repeated three times, and the resulting white crystalline product is rinsed with acetone and dried. The product is a polypropylene wax having a melt viscosity of 60,000 cp. at 190° C. and a DTA melting point of 165° C.

EXAMPLE 2

About 100 grams of polypropylene (I.V. 3.9) is obtained by the polymerization of propylene in an autoclave at 85° C., in the presence of 1.0 gram of the coordination catalyst used in Example 1. When the polymerization is completed, the autoclave is heated to 275° C., and then it is immediately cooled to room temperature. Fifty (50) ml. of isobutyl alcohol are added to deactivate the catalyst, and catalyst residues are removed from the low-viscosity resultant wax product by washing in additional quantities of hot isobutyl alcohol. The resulting product is a white, crystalline polypropylene wax having a melt viscosity of 40,000 cp., at 190° C. and a DTA melting point of 164° C.

EXAMPLE 3

The procedure of Example 2 is repeated except that the catalyst residues are removed by filtration rather than by washing with hot isobutyl alcohol. Thus, after the thermal treatment at 275° C. is completed, the low viscosity product is placed in one liter of mineral spirits (B.P. 190–210° C.), and the solution is heated to 180° C. and filtered through an asbestos filter medium under pressure to remove insoluble catalyst residues. The solution is then distilled to remove the mineral spirits and a low viscosity polypropylene wax having a melt viscosity of 32,000 cp. at 190° C. is obtained.

EXAMPLE 4

Three hundred (300) grams of high molecular weight polypropylene (I.V.=3.39) are prepared by polymerization of propylene at 50° C. with a triethylaluminum:titanium trichloride catalyst [$(C_2H_5)_3Al/TiCl_3$], and the high molecular weight polymer is then treated with isobutyl alcohol to deactivate the catalyst residues. The polymer, containing the deactivated catalyst residue is placed in a stainless steel atuoclave under a nitrogen atmosphere. One liter of dry n-hexane is added, and the mixture is heated at 350° C., with rocking, for two hours. The autoclave is then cooled to room temperature and the product is removed as a white powder. The polypropylene wax product has a melt viscosity of 2,000 cp. at 190° C., a Shore Durometer hardness of D–51, a density of 0.92, and an inherent viscosity of 0.21.

EXAMPLE 5

A stainless steel autoclave is charged with 150 ml. of n-hexane and 50 grams of poly-1-butene (I.V.=2.3) which has been previously prepared with the coordination catalyst used in Example 4. The autoclave is flushed with nitrogen to remove air, and heated at 400° C. for fifteen (15) minutes, with rocking. The autoclave is then cooled to room temperature and the product is removed as a powder. Catalyst residues are removed from the polymer by treatment with isobutyl alcohol. The resulting poly-1-butene powder has a melt viscosity of 1,000 cp. at 190° C. and a penetration hardness of 18.0 (ASTM D–5–52).

EXAMPLE 6

One hundred (100) grams of poly-1-butene (I.V.=1.34) containing a deactivated $(C_2H_5)_2AlCl/TiCl_3$ polymerization catalyst residue is placed in a flask equipped with a stirrer. The reaction medium in the flask is subjected to a reduced pressure of 2 mm. of Hg, and heated at 350° C. for 55 minutes. A sample removed from the flask at the end of twenty (20) minutes of heating had a melt viscosity of 650 cp. at 190° C. This test establishes that the degradation procedure of this invention allows the securance of desired low viscosity wax products at extremely short degradation contact periods.

EXAMPLE 7

A flask is charged with 38 grams of high molecular weight 50/50 propylene/1-butene copolymer (I.V.=1.74) prepared from equal parts of propylene and 1-butene. The copolymer is prepared in the presence of the coordination catalyst used in Example 1, and the copolymer charged to the flask contains the residue of this catalyst, which has been deactivated with dry isobutyl alcohol. The flask is purged with nitrogen to provide an inert atmosphere, and the polymer is then heated in a sand bath at 350° C. for 30 minutes, with stirring. The flask is cooled to room temperature and a tough, dark brown copolymer product having a melt viscosity of 63,000 cp. at 190° C. is removed. This product when analyzed is found to contain 420 p.p.m. Ti and 250 p.p.m. Cl.

EXAMPLE 8

In this example, a copolymer (I.V.=1.64) prepared from 60 percent propylene and 40 percent 1-butene is polymerized in a stainless steel rocking autoclave in the presence of n-heptane as a solvent and the polymerization catalyst of Example 1. After two (2) hours of polymerization, the autoclave is cooled to room temperature and vented. The autoclave is then filled with nitrogen and heated at 275° C. for ten (10) minutes in the presence of the live residue of the polymerization catalyst. The autoclave is cooled to room temperature and isobutyl alcohol is added. The reaction mixture is reheated at 110° C. for thirty (30) minutes to remove the catalyst residues, and the autoclave is cooled again to room temperature. The isolated product is a waxy copolymer in the form of a white powder. The copolymer has a melt viscosity of 40,000 cp. at 190° C. and contains 21 p.p.m. titanium and 120 p.p.m. chlorine.

Comparison of this product with the product of Example 7 illustrates the effectiveness of the catalyst residue removal procedure of the present invention.

EXAMPLE 9

A high molecular weight polypropylene (I.V.=2.0) containing live residues of the polymerization catalyst of Example 1 is continuously fed into the bottom of a stirred multizone stainless steel reactor by an extruder. The stirrer is driven at a speed of 1500 r.p.m., and the reactor is operated at 275° C. for a contact time of twenty-five (25) minutes. The degraded polymer product is removed from the top of the reactor at a rate of 25 lb./hr. and is passed to a digestion chamber. The low viscosity polypropylene wax product is treated with isobutyl alcohol at 100° C. in the digestion chamber to remove the catalyst residues. The resulting polymer is filtered, dried, and stabilized with 0.3 percent dilauryl thiodipropionate and 0.1 percent dioctadecyl p-cresol. The product is a hard white, brittle wax having a melt viscosity of 8,000 cp. at 190° C.

EXAMPLE 10

This example is carried out for comparative purposes to illustrate the effect of the presence of catalyst residue on the process of this invention.

A stainless steel autoclave is charged with 100 grams of dry polypropylene pellets (I.V.=1.95); melt flow of 2.6 at 230° C. from which the polymerization catalyst residues have been removed. The autoclave is purged with dry nitrogen to remove the air, and heated at 250° C., with rocking, for 1 hour. The autoclave is then cooled to room temperature and the product removed. The product is a hard, plastic stick of polypropylene having an I.V. of 1.93 and a melt flow at 230° C. of 2.1. This example demonstrates that the molecular weight of polypropylene is substantially unchanged by treatment at 250° C. in the absence of catalyst residues.

EXAMPLES 11–18

In these examples, various high molecular weight polyolefins are thermally degraded by the general procedure followed in Example 5. The reaction temperatures, reaction times and particular catalyst residues used in these examples are set forth in Table I. Table I also shows the high molecular weight polyolefin degraded in each example, the initial I.V. of these polymers, and the melt viscosity of the polyolefin wax products produced.

TABLE I

| Example Number | Polyolefin degraded | I.V. | Catalyst | Reaction Temp. (° C.) | Reaction Time (min.) | Melt viscosity (cp. at 190° C.) |
|---|---|---|---|---|---|---|
| 11 | Poly-1-hexene | 2.6 | $2/1/3(C_2H_5)_3Al_2Cl_3/[(CH_3)_2N]_3P(O)/TiCl_3$ | 300 | 60 | 2,000 |
| 12 | Poly-1-dodecene | 1.8 | $(C_2H_5)_2AlBr/TiCl_3$ | 275 | 60 | 5,500 |
| 13 | Poly(4-methyl-1-pentene) | 2.5 | $(C_2H_5)_2Al/TiCl_3$ | 275 | 60 | 3,200 |
| 14 | 50/50 copolymer of ethylene and propylene | 1.7 | $(C_2H_5)_2AlCl/VOCl_3$ | 300 | 45 | 12,000 |
| 15 | 90/10 copolymer of propylene and 4-methyl-1-pentene | 1.5 | $LiAlH_4/TiCl_3$ | 325 | 30 | 3,900 |
| 16 | 92/8 copolymer of 1-butene and 1-octene | 2.3 | $1/0.7/1 C_2H_5AlCl_2/(C_4H_9)_3N/TiCl_3$ | 150 | 480 | 90,000 |
| 17 | 70/30 copolymer of 1-butene and 4-methyl-1-pentene | 1.2 | $LiAl(C_3H_7)_4/TiCl_4$ | 275 | 60 | 4,000 |
| 18 | Polyethylene | 2.7 | $(C_2H_5)_2AlCl/TiCl_4$ | 325 | 60 | 8,000 |

The invention has been described in considerable detail with particular reference to preferred embodiments thereof, but it will be understood that variations and modifications can be effected within the spirit and scope of the invention as described hereinabove and as defined in the appended claims.

What is claimed is:

1. A process for the preparation of low viscosity polyolefin waxes which comprises polymerizing an olefin with a transition metal containing coordinating catalyst to a high molecular weight polyolefin having an inherent viscosity of at least 1.2 and deactivating all of said coordination catalyst; the improvement which comprises degrading said high molecular weight polyolefin by
   (a) retaining said deactivated coordination catalyst residues in said polyolefin, and
   (b) heating said polyolefin at a temperature of about 150 to 400° C. in the absence of oxygen for a time sufficient to degrade the polyolefin to a low viscosity wax having an inherent viscosity in tetralin at 145° C. of from about 0.05 to about 0.7.

2. A process of claim 1, in which the coordination catalyst residue is removed from the low viscosity polyolefin wax after thermal degradation of the high molecular weight polyolefin is completed.

3. The process of claim 2, in which the coordination catalyst residue is removed from the polyolefin wax by washing the wax with an alcohol in which the metal residue of the catalyst is soluble and separating the metal-containing alcohol solution from the polyolefin wax product.

4. The process of claim 2, in which the coordination catalyst residue is removed from the polyolefin wax by dissolving the wax in a solvent in which the catalyst residue is insoluble, separating the catalyst residue from the polymer solution, and isolating the polyolefin wax.

5. The process of claim 1, in which the thermal degradation of the high molecular weight polyolefin is carried out at a temperature not greater than about 290° C.

6. The process of claim 5, in which the thermal degradation of the high molecular weight polyolefin is carried out at a temperature between about 250 and 275° C.

7. The process of claim 1, in which the thermal degradation is carried out by heating the high molecular weight polyolefin in an inert atmosphere.

8. The process of claim 1, in which the thermal degradation is carried out by heating the high molecular weight polyolefin under vacuum.

9. The process of claim 1, in which the thermal degradation is carried out by heating the high molecular weight polyolefin in a diluent.

10. The process of claim 1, in which the polyolefin is selected from the group consisting of homopolymers of ethylene, propylene, and 1-butene, and copolymers of at least two thereof.

11. The process of claim 10, in which the polyolefin is polypropylene.

12. The process of claim 10, in which the polyolefin is polyethylene.

13. The process of claim 10, in which the polyolefin is poly-1-butene.

14. The process of claim 10, in which the polyolefin is a copolymer of propylene and 1-butene.

15. The process of claim 10, in which the polyolefin is a copolymer of propylene and ethylene.

16. A process for the preparation of low viscosity synthetic waxes from high molecular weight polyolefins which comprises heating a high molecular weight polyolefin having an inherent viscosity of 1.2 to 10.0 at a temperature between about 150 and 400° C. in the absence of oxygen and in the presence of a deactivated olefin transition metal coordination polymerization catalyst residue for a time sufficient to degrade the polyolefin to a low viscosity polyolefin wax having an inherent viscosity in tetralin at 145° C. of from about 0.05 to about 0.7.

17. The process of claim 16, in which the catalyst residue is removed from the polyolefin wax after thermal degradation.

18. The process of claim 16, in which the polyolefin is polypropylene.

19. The process of claim 16, in which the polyolefin is polyethylene.

20. The process of claim 16 in which the high molecular weight polyolefin is heated at a temperature below 290° C.

References Cited

UNITED STATES PATENTS

| 3,001,976 | 9/1961 | Langer | 260—93.7 |
| 3,271,372 | 9/1966 | Caywood | 260—80.5 |

FOREIGN PATENTS

| 638,007 | 1/1964 | Belgium | C—08h |

OTHER REFERENCES

Rysavy, D. and Balaban, L., The Effect of Polymerization Catalysts on the Rate of Degradation of Isotactic Polypropylene, Polymer Science—U.S.S.R., pp. 147–152, vol. 3, 1962.

JOSEPH L. SCHOFER, Primary Examiner

R. S. BENJAMIN, Assistant Examiner

U.S. Cl. X.R.

260—93.7, 94.9